No. 724,765. PATENTED APR. 7, 1903.
M. C. WHITE & O. C. DURYEA.
SPEED GOVERNOR.
APPLICATION FILED JUNE 17, 1902.
NO MODEL.
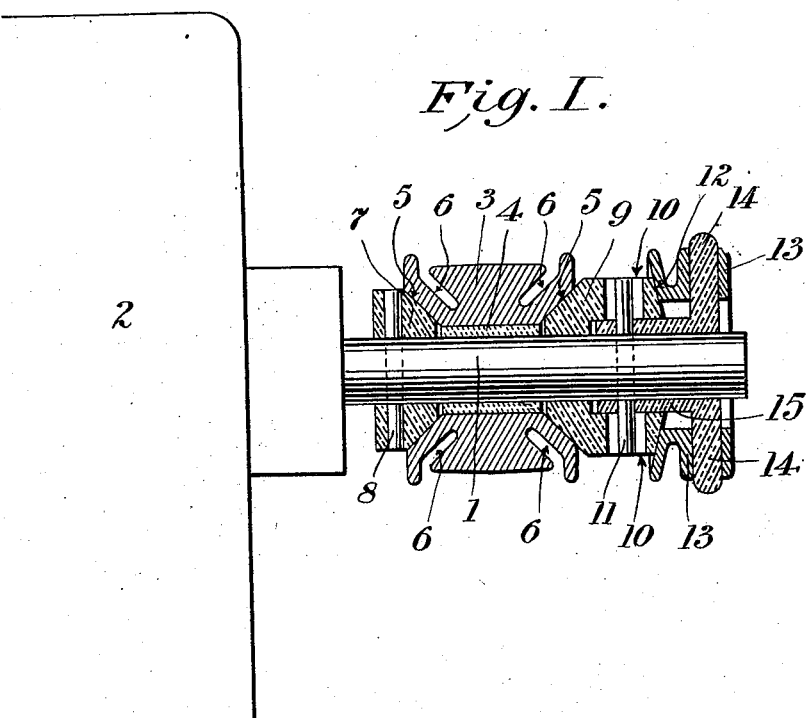
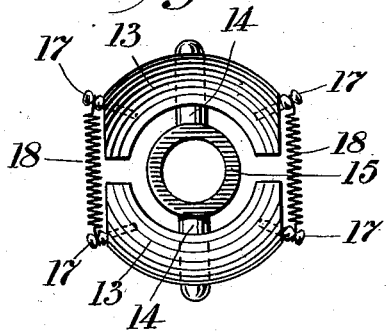
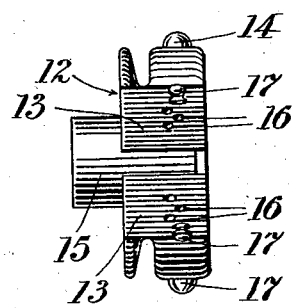
Witnesses:
G. T. Hackley
Edmund A. Strauss
Inventors:
Morris C. White
Otho C. Duryea
by Townsend Bros
their Attys

UNITED STATES PATENT OFFICE.

MORRIS C. WHITE AND OTHO C. DURYEA, OF LOS ANGELES, CALIFORNIA.

SPEED-GOVERNOR.

SPECIFICATION forming part of Letters Patent No. 724,765, dated April 7, 1903.

Application filed June 17, 1902. Serial No. 112,100. (No model.)

*To all whom it may concern:*

Be it known that we, MORRIS C. WHITE and OTHO C. DURYEA, citizens of the United States, residing at Los Angeles, in the county of Los Angeles and State of California, have invented new and useful Improvements in Speed-Governors, of which the following is a specification.

Our invention relates to means for governing an electric generator by frictional devices which are controlled by means operating by centrifugal force.

One object of the invention is to provide means whereby a dynamo which generates an electric current for sparking purposes in an explosive-engine may be driven at a substantially regular speed.

Another object is to provide means whereby the maximum of friction may be obtained with the least possible heating of the parts.

Another object is to provide a governor of the character described in which the required amount of friction is produced without the use of friction-wheels of large diameter, thus rendering the governor especially useful for automobile-engines, where economy of space is an important desideratum.

Another object is to provide means whereby the governor may be manually adjusted quickly and positively.

Other objects—such as simplicity of construction, effectiveness in operation, durability of the parts, and other desirable features not mentioned above—will be brought out in the description of the invention.

Referring to the drawings, Figure I is a sectional view of the invention, only a portion of the dynamo being shown. Fig. II is a detail of a centrifugal device. Fig. III is a side elevation of the centrifugal device with the spring removed.

Upon the shaft 1 of an electric machine 2 a pulley 3 is loosely mounted, being movable longitudinally of the shaft and also adapted to turn relatively to the shaft.

4 is a bushing for the pulley. The pulley 3 is provided with friction-surfaces 5, which are formed by the walls of conical-shaped recesses in each side of the pulley. The pulley is also provided with air-grooves 6 adjacent each friction-face and preferably concentric therewith, so that a free circulation of air around the metal adjoining the friction-faces is secured, which prevents the metal from unduly heating.

7 is a conical friction-piece rigidly attached to the shaft 1 by a pin 8. The friction-piece 8 projects into one conical recess of the pulley and frictionally bears against the face of the recess. 9 is another conical friction-piece which projects into the opposite conical recess of the pulley and frictionally bears against the face of its adjacent recess. The friction-piece 9 is loosely mounted on the shaft 1 and is provided with diametrically opposite slots 10, into which a pin 11 projects and prevents the friction-piece 9 from turning relatively to the shaft 1, but allowing a longitudinal movement of the friction-piece on the shaft.

The pulley 3 may be driven by a belt from the engine with which the dynamo coöperates in producing the sparks necessary for ignition.

The amount of friction with which the pulley engages both friction-pieces determines the relative speed of the dynamo. The requisite amount of friction may be obtained by slightly moving the piece 9 relatively to the pulley.

The movement of the piece 9 is obtained automatically by providing it with a coned face 12, against which weights 13 may bear. The weights 13 are each slidably mounted on rods 14, which project from diametrically opposite sides of a hub 15 and may preferably be integral therewith.

The hub 15 is rigidly mounted on the shaft 1, the pin 11 passing therethrough.

The weights 13 are preferably curved and are dished slightly to fit the coned face of the piece 9, against which they bear. Each weight is preferably provided with a series of holes 16. The axes of each series of holes converge toward the shaft 1.

17 represents pins, which are suitably positioned in the holes, and springs 18 connect each set of pins and serve to draw the weights toward each other, and thus cause the piece 9 to bear with considerable pressure against the pulley 3 and the latter in turn to similarly bear against the piece 7.

The pins 17 are positioned in suitable holes to obtain the requisite tension of the springs 18. When the pulley 3 is driven, it frictionally bears against each piece 7 and 9 and causes them to revolve, which drives the shaft and dynamo. When the speed of the pulley increases, the weights are caused to fly out and allow a slight retraction of the piece 9, which eases the friction existing between the pulley and both friction-pieces, and thereby reduces the speed of the shaft to regular speed. When the pulley falls below the regular speed, the weights are drawn together by the springs, which forces the pulley and friction-pieces closer together, increases the friction, and raises the speed of the shaft and dynamo. Thus should the speed of the pulley drop very low the weights might be drawn together by the springs and the pulley and friction-pieces would be crowded together, so that there would be no slip between the pulley and friction-pieces, and the parts would all revolve at the same speed, which would raise the speed of the dynamo. The series of holes in each weight permits of changing the position of the pins, so that the tension of the springs may be regulated. By giving the pins a slant relatively to the line of draft of the springs, as described, the pins are securely held from accidental displacement, although they may readily be changed to other holes when desired by removing the spring.

By employing conical-shaped friction-pieces a sufficient area of friction-surface is obtained with compact parts of small diameter.

We do not limit ourselves to the particular material of which the parts having friction-faces are made.

It is obvious that the herein-described embodiment of our invention is susceptible of various modifications without evading the scope of the claims.

What we claim, and desire to secure by Letters Patent of the United States, is—

1. In combination with the shaft of an electric machine, a friction-piece rigidly mounted on said shaft, another friction-piece slidably mounted on said shaft, a pulley loosely mounted on said shaft and bearing against said friction-pieces, and a centrifugal device mounted on said shaft and operatively engaging said slidable piece.

2. In combination with the shaft of an electric machine, a conical friction-piece rigidly mounted on said shaft, another conical friction-piece slidably mounted on said shaft, a pulley having a conical recess in each end thereof, said pulley being loosely mounted on said shaft between said friction-pieces, each friction-piece projecting into a conical recess, and a centrifugal device mounted on said shaft and operatively connected to said slidable piece.

3. In combination with the shaft of an electric machine, a conical friction-piece rigidly mounted on said shaft, another conical friction-piece slidably mounted on said shaft, a pulley having a conical seat in each end thereof, said pulley being loosely mounted on said shaft between said friction-pieces and having an annular groove concentric with its conical seat, and a centrifugal device mounted on said shaft and operatively engaging said slidable piece.

4. In combination with the shaft of an electric machine, a friction-piece rigidly mounted on said shaft, another friction-piece slidably mounted on said shaft, a pulley loosely mounted on said shaft between said friction-pieces and bearing against said friction-pieces, hubs rigidly mounted on said shaft, a weight slidably mounted on each hub, said weights having dished faces, said slidable friction-piece having a coned face which bears against the dished faces of said weights, and means for yieldingly holding said weights against the coned face of said slidable friction-piece.

5. In combination with the shaft of an electric machine, a friction-piece rigidly mounted on said shaft, another friction-piece slidably mounted on said shaft, a pulley loosely mounted on said shaft between said friction-pieces and bearing against said friction-pieces, hubs rigidly mounted on said shaft, a weight slidably mounted on each hub, said weights having dished faces, said slidable friction-piece having a coned face which engages the dished faces of said weights, and springs connected with said weights for yieldingly holding said weights in contact with said slidable friction-piece.

6. In combination with the shaft of an electric machine, friction-pieces mounted on said shaft, one of said pieces being movable on said shaft, a pulley loosely mounted on said shaft between said friction-pieces and bearing against the same, weights connected to said shaft and yieldingly held against said movable friction-piece, said weights having dished faces which bear against said movable friction-piece.

7. In combination with the shaft of an electric machine, conical friction-pieces mounted on said shaft, one of said pieces being slidable on said shaft, a pulley loosely mounted on said shaft between said friction-pieces, said pulley having oppositely-arranged conical recesses, said conical friction-pieces projecting into opposite recesses in said pulley and bearing against the pulley, weights connected to said shaft and yieldingly held against said slidable friction-piece, said weights having dished faces which bear against said slidable friction-piece.

8. In combination with the shaft of an electric machine, conical friction-pieces mounted on said shaft, one of said pieces being slidable on said shaft, a pulley loosely mounted on said shaft between said pieces, said pulley having oppositely-arranged conical recesses, the conical friction-pieces projecting into the recesses in said pulley, said slidable friction-piece having a longitudinal slot therein, a pin connected to said shaft and projecting into said slot, weights connected to said shaft and yieldingly held against said slidable friction-piece, said weights having dished faces which bear against said slidable friction-piece.

9. In combination with the shaft of an electric machine, a conical friction-piece rigidly mounted on said shaft, another conical friction-piece slidably mounted on said shaft, a pulley loosely mounted on said shaft between said friction-pieces and having oppositely-arranged conical recesses, each conical friction-piece projecting into opposite recesses in the pulley, hubs on said shaft, diametrically opposite rods projecting radially from said hubs, weights slidably mounted on said rods, one of said weights having a series of holes, a pin in one of said holes, a spring connected to said pin and to the other weight, said slidable friction-piece having a coned face, said weights having dished faces which bear against the coned face of said slidable piece.

10. In combination with the shaft of an electric machine, oppositely-arranged weights connected to said shaft, each of said weights having oppositely-arranged series of holes on said shaft, two pins on each weight, said pins lying in holes in the opposite series, springs connected at one end to the opposite pins of one weight and at the other end connected to the opposite pins of the other weight, the angle between the line of direction in which said pins extend and the line of draft of said spring being an acute angle, and means cooperating with said weights for frictionally driving said shaft.

11. In combination with the shaft of an electric machine, a friction-piece slidably mounted on said shaft, a pulley loosely mounted on said shaft and bearing against said friction-piece, another friction-piece rigidly mounted on said shaft and bearing against the opposite side of said pulley, weights flexibly mounted on said shaft, said weights being movable radially on said shaft and having means bearing against said slidable friction-piece for moving said piece longitudinally.

In testimony whereof we have signed our names to this specification, in the presence of two subscribing witnesses, at Los Angeles, California, this 10th day of June, 1902.

MORRIS C. WHITE.
OTHO C. DURYEA.

Witnesses:
G. T. HACKLEY,
F. M. TOWNSEND.